US007996146B2

(12) United States Patent
Ruiz

(10) Patent No.: US 7,996,146 B2
(45) Date of Patent: Aug. 9, 2011

(54) INTERNAL COMBUSTION ENGINE, CONTROL SYSTEM AND OPERATING METHOD FOR DETERMINING A FUEL ATTRIBUTE

(75) Inventor: Victoriano Ruiz, Brighton, MI (US)

(73) Assignee: Caterpillar Inc., Peoria, IL (US)

( * ) Notice: Subject to any disclaimer, the term of this patent is extended or adjusted under 35 U.S.C. 154(b) by 401 days.

(21) Appl. No.: 12/317,745

(22) Filed: Dec. 29, 2008

(65) Prior Publication Data

US 2010/0168983 A1 Jul. 1, 2010

(51) Int. Cl.
*G06F 19/00* (2006.01)
*F02M 51/00* (2006.01)
*G01M 15/00* (2006.01)

(52) U.S. Cl. ...... 701/104; 701/115; 123/436; 73/114.38

(58) Field of Classification Search .................. 123/299, 123/300, 304, 431, 478, 480, 486, 494, 1 A, 123/525, 526, 575, 27 GE, 435, 436; 701/101-105, 701/110, 111, 115; 73/114.38, 114.52, 114.53; 702/182, 183, 186, 187
See application file for complete search history.

(56) References Cited

U.S. PATENT DOCUMENTS 4,557,236 A * 12/1985 Showalter ..................... 123/436
4,706,630 A 11/1987 Wineland et al.
4,920,494 A 4/1990 Abo et al.
5,537,978 A 7/1996 Watanabe et al.
5,586,537 A 12/1996 Tomisawa et al.
5,988,140 A * 11/1999 Gartner et al. ................ 123/436
6,158,416 A * 12/2000 Chen et al. .................... 123/380
6,314,944 B1 11/2001 Majima
6,360,726 B1 * 3/2002 Javaherian ................. 73/114.38
6,474,308 B2 11/2002 Okumura et al.
6,668,812 B2 * 12/2003 Javaherian .................... 701/111
6,745,613 B2 6/2004 Rendahl et al.
6,748,928 B2 6/2004 Shingole
6,951,205 B2 10/2005 Joos et al.
6,994,075 B2 2/2006 Penschuck
7,050,901 B2 5/2006 Yasuda et al.
7,089,746 B2 8/2006 Lieuwen et al.
7,117,862 B2 10/2006 May
7,383,816 B2 6/2008 Zurlo
7,455,048 B2 * 11/2008 Maier-Landgrebe ......... 123/436
7,657,361 B2 * 2/2010 Inoue et al. ................... 701/104
7,822,536 B2 * 10/2010 Sata et al. ..................... 701/113
7,878,173 B2 * 2/2011 Kishibata ...................... 123/319
2006/0249120 A1 * 11/2006 Semii et al. ................... 123/446
2008/0060598 A1 3/2008 Dobeck

* cited by examiner

*Primary Examiner* — Willis R Wolfe, Jr.
(74) *Attorney, Agent, or Firm* — Liell & McNeil

(57) ABSTRACT

A method of operating a fuel injected multi-cylinder internal combustion engine includes electronically storing a first value or reference value indicative of an engine speed response to a commanded fueling duration change during fueling the engine with a first fuel or reference fuel, such as a known type of diesel fuel. The method further includes operating the internal combustion engine in a fuel testing mode during fueling with a second fuel or test fuel, such as an unknown type of diesel fuel. The fuel testing mode includes determining a second value or test value indicative of an engine speed response to a commanded fueling duration change, comparing the test value with the reference value and outputting a fuel attribute signal which is based at least in part on comparing the reference value and the test value. If a difference between the reference value and the test value satisfies corrective action criteria, a corrective action such as adapting fuel injector control signal duration or shutting down the engine can be taken. An engine and control system whereby the operating method is executed are also provided.

18 Claims, 3 Drawing Sheets

INTERNAL COMBUSTION ENGINE, CONTROL SYSTEM AND OPERATING METHOD FOR DETERMINING A FUEL ATTRIBUTE

TECHNICAL FIELD

The present disclosure relates generally to fuel attribute testing in an internal combustion engine, and relates more particularly to fuel attribute testing by comparing an engine speed response to a fueling change with a test fuel and an engine speed response to a fueling change with a reference fuel.

BACKGROUND

Combustion engines having a wide variety of designs and fueling strategies have been known for many years. The use of different fuels in an engine depending upon fuel availability, combustion characteristics, and engine operating environment has become commonplace. Jurisdictional requirements may also suggest different fuel types or fuel blends for different seasons. The use of winter diesel versus summer diesel in compression ignition diesel engines is a well-known example.

In certain engines, a given control strategy may be implemented regardless of variation in fuel type or fuel blend characteristics. This may be the case because the engine is relatively insensitive to fuel type/quality variation, or because the engine is not equipped with certain control hardware to address such variation. In other engines, particularly internal combustion engines employing modern engine control and emissions reduction strategies, the manner in which the engine or related systems are controlled may depend upon the type of fuel being used. For instance, an electronically controlled engine might calculate fuel injector control signal duration based on one map for a first fuel type but based on another map for a second fuel type. In still other instances, the frequency or manner in which exhaust particulate filters are regenerated or controlled might vary depending upon what type of fuel is being used in an engine. In addition to fuel type, the quality of a particular fuel being used, such as the relative amount of impurities like water, might also affect what engine control or emissions reduction strategy is chosen. To optimally make use of available engine controls and engine subsystems, it will be readily apparent that identification of the fuel type or fuel quality being used in an engine may be required.

For the reasons explained above, internal combustion engines may employ various mechanisms for determining the type or quality of fuel being used therein. Sensors adapted to interact with fuel or combustion products have been proposed. Such sensors tend to add expense and complexity to engine systems, however. In recent years, engineers have also proposed ways to test fuel type or quality by observing operation of an engine under certain conditions without directly sensing fuel type or quality. One example of a strategy for observing engine behavior and indirectly deducing fuel properties is known from U.S. Pat. No. 5,817,923 to Ohsaki et al. (hereinafter "Ohsaki"). Ohsaki proposes to measure a time period between turning on a starter switch or initiating fuel injection and the engine reaching a predefined rotation speed. The duration of the time period, an engine speed gradient during the time period and a change amount in rotation during the time period are determined. By weighting these factors, a controller purportedly determines whether the fuel in use is heavy or light. Ohsaki may have certain applications, but the necessary calculations are relatively complex and, moreover, a multiplicity of confounding factors may exist during engine start-up which could compromise the integrity of the strategy under field conditions.

SUMMARY

In one aspect, a method of operating a fuel injected multi-cylinder internal combustion engine includes a step of electronically storing a first value indicative of an engine speed response to a commanded fueling duration change between a first set of successive engine cycles and a second set of successive engine cycles during fueling the internal combustion engine with a first fuel. The method further includes a step of determining a second value indicative of another engine speed response to a commanded fueling duration change between a third set of successive engine cycles and a fourth set of successive engine cycles during fueling the internal combustion engine with a second fuel. The method further includes the steps of comparing the second value with the first value and outputting a fuel attribute signal responsive to comparing the second value with the first value.

In another aspect, an internal combustion engine includes an engine housing defining a plurality of cylinders and a plurality of pistons associated one with each of the cylinders and positioned at least partially therein. The internal combustion engine further includes a fuel system including a plurality of electronically controlled fuel injectors each configured to inject a fuel for a controllable fueling duration into one of the plurality of cylinders. The internal combustion engine further includes an engine control system including an engine speed sensor, a computer readable memory and an electronic control unit in communication with the engine speed sensor, the computer readable memory and the plurality of electronically controlled fuel injectors. The electronic control unit is configured to store a first value on the computer readable memory which is indicative of an engine speed response to a commanded fueling duration change between a first set of successive engine cycles and a second set of successive engine cycles during fueling the internal combustion engine with a first fuel. The electronic control unit is further configured to determine a second value indicative of an engine speed response to a commanded fueling duration change between a third set of successive engine cycles and a fourth set of successive engine cycles during fueling the internal combustion engine with a second fuel, and responsively output a fuel attribute signal which is based at least in part on comparing the second value with the first value.

In still another aspect, a control system for a fuel injected multi-cylinder internal combustion engine includes a computer readable memory storing a first value indicative of an engine speed response to a commanded fueling duration change between a first set of successive engine cycles and a second set of successive engine cycles during fueling the internal combustion engine with a first fuel. The control system further includes an electronic control unit coupled with the computer readable memory and configured to receive inputs corresponding to a monitored engine speed of the internal combustion engine. The electronic control unit is further configured to determine a second value indicative of an engine speed response to a commanded fueling duration change between a third set of successive engine cycles and a fourth set of successive engine cycles during fueling the internal combustion engine with a second fuel, and further configured to output a fuel attribute signal which is based at least in part on comparing the second value with the first value.

DETAILED DESCRIPTION

Figure 1:
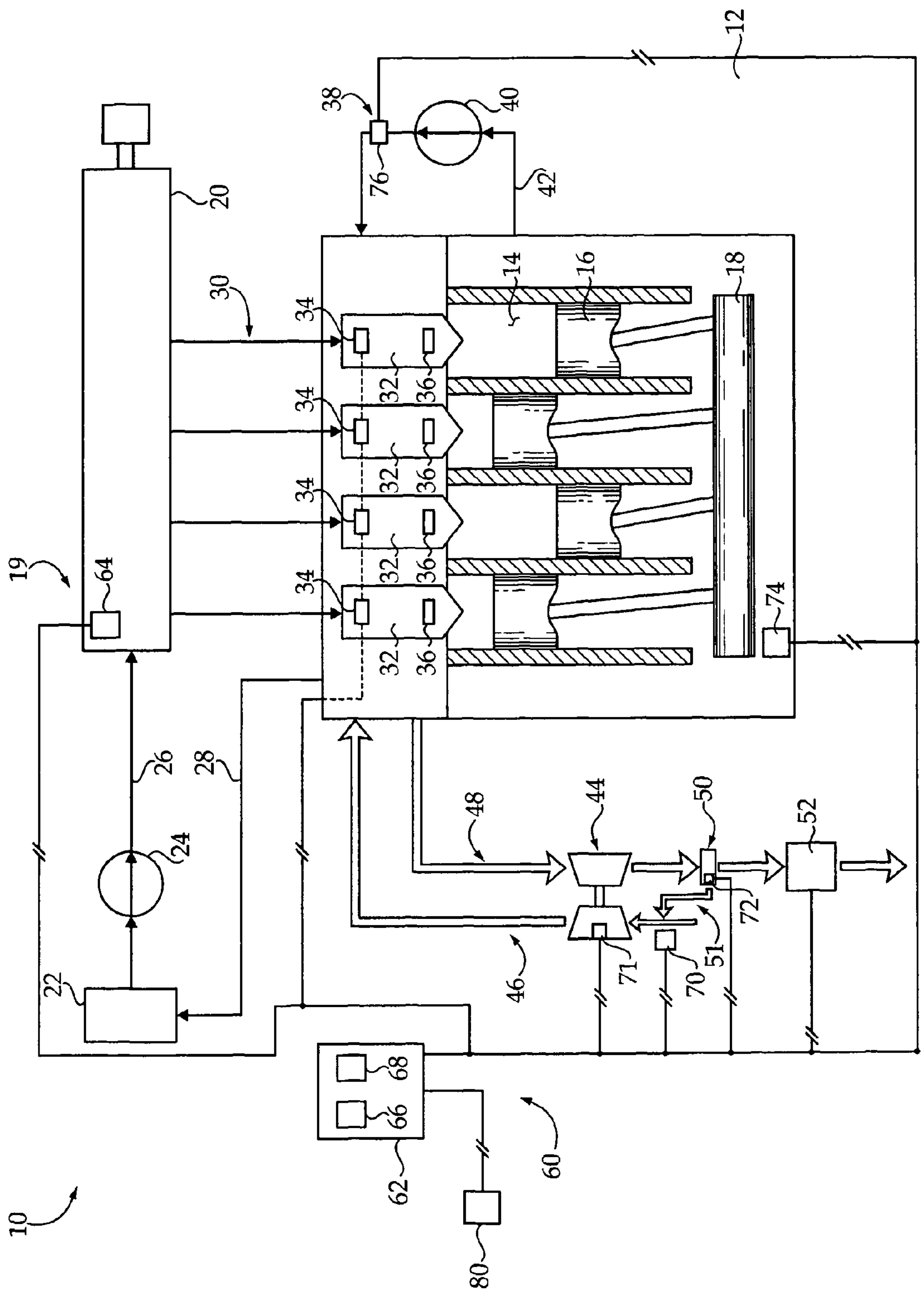
FIG. 1 is a side diagrammatic view of an internal combustion engine according to one embodiment.

Referring to FIG. 1, there is shown an internal combustion engine 10 according to one embodiment. Internal combustion engine 10 may include a fuel injected multi-cylinder engine having an engine housing 12 defining a plurality of cylinders 14. A plurality of pistons are positioned one within each of cylinders 14 and movable therein. Pistons 16 are each coupled with a crankshaft 18 in a conventional manner. In one embodiment, engine 10 may be a compression ignition engine such as a diesel engine, but in other embodiments might be a different type of combustion engine. Hence, each of pistons 16 may be configured to increase a pressure within a corresponding one of cylinders 14 to an autoignition threshold. Engine 10 may further include a fuel system 19 which includes a plurality of electronically controlled fuel injectors 32 each configured to inject a fuel for a controllable fueling duration into one of cylinders 14.

In one embodiment, engine 10 may be a direct injection engine where fuel injectors 32 are each positioned partially within a corresponding one of cylinders 14. Each of fuel injectors 32 may include an electrical actuator 34 such as a solenoid actuator or a piezoelectric actuator which is configured to change in electrical energy state to control the position of an injection valve 36. In one embodiment, injection valves 36 may include control valves which vary a pressure acting on a control surface of an outlet check (not shown) in a conventional manner. Controlling a duration of fuel injector control commands to each of electrical actuators 34 as further described herein may be used to vary an amount of fuel injected by each of fuel injectors 32 from one engine cycle to the next. As will be further apparent from the following description, varying a fuel injection amount under controlled conditions and observing a response of engine 10 may be used to deduce the attributes of a fuel being used by engine 10, such as a relative energy content of the fuel.

Fuel system 19 may further include a fuel tank 22, which is connected with a common rail 20 via a fuel supply conduit 26. A fuel pump 24 may be positioned within fuel supply conduit 26 to provide pressurized fuel to common rail 20 in a conventional manner. A fuel return conduit or drain conduit 28 may extend from engine housing 12 to fuel tank 22. A plurality of fuel supply lines 30 may fluidly connect common rail 20 with each one of fuel injectors 32. While a common rail design provides one practical implementation strategy, in other embodiments engine 10 might include unit pumps such as cam actuated pumps, or even a combination cam-driven and common rail system. As alluded to above, engine 10 may be a diesel engine fueled via supplying a diesel fuel to common rail 20. Multiple different types of fuel may be used, such as winter diesel, summer diesel, biodiesel, or still other fuels such as JP8. Fuel may also vary in quality such as relative contaminant content among different fueling stations, and hence fuel system 19 may supply engine 10 with fuel having a varying quality depending upon where the fuel is purchased. Description herein of different fuel “types” should be understood to refer to different fuel blends such as winter diesel versus summer diesel, chemically different fuels such as petroleum diesel versus biodiesel and different fuel qualities such as relatively uncontaminated fuel versus relatively contaminated fuel. Diesel engines tend to have a relatively lower RPM range amenable to fuel attribute testing according to the present disclosure, as further described herein. It should be understood, however, that the present disclosure is applicable to non-diesel engines except as otherwise noted.

Engine 10 may further include a cooling system 38, such as a conventional engine coolant circulation system having a cooling conduit 42 adapted to circulate engine coolant or the like through engine housing 12 via a pump 40. Engine 10 may also include a turbocharger 44 positioned to receive exhaust gases passed out of engine housing 12 via an exhaust pathway 48. In a conventional manner, turbocharger 44 may also include a compressor positioned within an intake pathway 46 to compress intake air for supplying to engine housing 12. An exhaust gas recirculation mechanism such as an EGR valve 50 may also be positioned to receive exhaust gases in exhaust pathway 48. EGR valve 50 may control a relative amount of exhaust gases which are recirculated via an EGR loop 51 to intake pathway 46. EGR loop 51 may connect with intake pathway 46 upstream turbocharger 44 in one embodiment. Exhaust gases passing through exhaust pathway 48 may also be directed through an exhaust particulate filter 52 in a conventional manner.

Engine 10 may further include an engine control system 60 having an electronic control unit 62 which includes a computer such as a digital microprocessor 68 and a computer readable memory 66 coupled with microprocessor 68. Computer readable memory 66 may include RAM, ROM, flash memory or any other suitable electronic storage medium. Microprocessor 68 may likewise be any of a wide variety of suitable processors, and in one embodiment may include a digital engine speed governor. As will be understood by those skilled in the art, a digital engine speed governor typically receives engine speed requests from an operator input device or from another microprocessor and responsively outputs fueling control commands mapped to engine speed. To this end, computer readable memory 66 may store engine speed to fueling maps defining a signal duration for fuel injector control commands sent via processor 68 to each of electrical actuators 34 which are controllably coupled therewith. Different maps may be provided corresponding to different fuel types suitable for use in engine 10. Additional electronic storage media and additional microprocessors may also be used, and it should therefore be appreciated that the depiction of electronic control unit 62 in FIG. 1 is purely illustrative. For instance, in certain embodiments, control functions for engine 10 such as speed governing may be performed by a first microprocessor such as microprocessor 68. Other functions such as fuel attribute calculations as described herein might be performed by a second microprocessor. Microprocessor 68 may also include a memory writing device configured to store data in a computer readable format on memory 66, also as further described herein.

Control system 60 may further include a plurality of sensors configured to monitor a plurality of different engine operating parameters. One practical implementation strategy includes hard wiring each of the plurality of sensors to electronic control unit 32 via a communications bus or the like. To this end, electronic control unit 62 may include appropriate input interface(s) (not shown) for receiving sensor data, and may also be configured via the same or a separate input interface to receive data inputs from a different processor.

Certain engine operating parameters such as engine load may in fact be monitored or determined by processing data from multiple sensors and/or based on control signal data rather than via an input from a single sensor. It should thus be appreciated that electronic control unit 62 may be configured to receive electronic inputs including either sensor signals or data signals which are indicative of a plurality of different engine operating parameters, and is not limited to any particular architecture and/or type or number of processors, input interfaces, etc.

In one embodiment, a fuel pressure sensor 64 may be coupled with common rail 20 and configured to output signals to electronic control unit 62 which are indicative of a fuel pressure in common rail 20. A temperature sensor 76 may be positioned within cooling conduit 42 and configured to output signals to electronic control unit 62 which are indicative of a temperature of coolant circulated in cooling system 38. An engine speed sensor 74 may be coupled with crankshaft 18 and configured to output signals indicative of a rotational speed of crankshaft 18. Electronic control unit 62 may thus be configured via receipt of signals from engine speed sensor 74 to monitor a rotational speed of engine 10. An EGR valve position sensor 72, or another suitable sensing mechanism, may also be provided and coupled with electronic control unit 62 to enable electronic control unit 62 to determine an exhaust gas recirculation amount/rate in a conventional manner. An intake airflow sensor 70, such as a throttle position sensor or the like, may also be provided and positioned within intake pathway 46 such that sensor 70 outputs signals to electronic control unit 62 indicative of an intake airflow amount/rate during operating engine 10. Electronic control unit 62 may also be coupled with exhaust particulate filter 52, or with control mechanisms therefor, to enable electronic control unit 62 to determine a regeneration state, such as a regeneration-on or regeneration-off state, of exhaust particulate filter 52. A boost pressure sensor 71 may also be coupled with turbocharger 44 in one embodiment. Other engine operating parameters may also be monitored via control system 60, such as intake air temperature, exhaust temperature, exhaust pressure, exhaust gas constituents, and a variety of other engine operating parameters which are conventionally monitored in modern compression ignition diesel engines. Control system 60 may further include a signaling device 80 coupled with electronic control unit 62 and having a plurality of signaling device states. Signaling device 80 may include an operator perceptible signaling device such as a light or an audible alarm which signals an operator to take a corrective action under circumstances further described herein. Signaling device 80 might also include a signaling device communicating electronically with other components of control system 60 to enable a computer-controlled or other automated corrective action.

Electronic control unit 62 may be configured by way of processor 68 to execute one or more control algorithms which include computer executable code stored on computer readable memory 66. In one embodiment, a first control algorithm or data acquisition algorithm is resident on computer readable memory 66. Electronic control unit 62 may acquire reference data regarding a known reference fuel via executing the first control algorithm. In particular, engine 10 may be operated via executing the data acquisition algorithm in a data acquisition mode during fueling engine 10 with a first fuel or reference fuel such as a known type of diesel fuel. In the data acquisition mode, electronic control unit 62 may electronically store a first value or reference value on computer readable memory 66 which is indicative of an engine speed response to a commanded fueling duration change between a first set of successive engine cycles and a second set of successive engine cycles.

The commanded fueling duration change may take place by way of changing a duration of fuel injector control commands output via electronic control unit 62 to electrical actuators 34. In the data acquisition mode, engine 10 may be operated under a given set of engine operating conditions or at a given "operating point," further described herein, where reliably accurate and precise engine speed response data are expected to be obtained. When operated at the given operating point, an engine RPM change in response to a commanded fueling duration change may be sensed via receipt of engine speed signals from sensor 74. The reference value electronically stored on memory 66 may be an arithmetic difference between an engine speed prior to commanding the fueling duration change and an engine speed subsequent to commanding the fueling duration change.

The reference value obtained in the data acquisition mode may be used later during fueling engine 10 with second fuel or test fuel to determine a fuel attribute of the test fuel by comparing a second value or test value for the test fuel with the reference value, as further described herein. A second control algorithm or fuel testing algorithm may be resident on computer readable memory 66. It should be appreciated that the data acquisition algorithm and fuel testing algorithm described herein might include the same control algorithm in one embodiment. Thus, data acquisition may take place when operating engine 10 during fueling with a reference fuel, and fuel testing may take place during fueling with a test fuel. The same control algorithm may be executed to obtain reference data for the reference fuel and to obtain test data for the test fuel.

Electronic control unit 62 may acquire test data regarding an unknown test fuel via executing the fuel testing algorithm. In particular, engine 10 may be operated via executing the fuel testing algorithm in a fuel testing mode. The fuel testing mode may include determining a test value indicative of another engine speed response to a commanded fueling duration change between a third set of successive engine cycles and a fourth set of successive engine cycles. In a manner analogous to the data acquisition mode, in the fuel testing mode electronic control unit 62 may receive engine speed signals from sensor 74 and determine a test value corresponding to an arithmetic difference between an engine speed prior to commanding a fueling duration change and an engine speed subsequent to commanding the fueling duration change. The test value may then be compared via electronic control unit 62 with the previously determined reference value. Electronic control unit 62 may then output a fuel attribute signal which is based at least in part on a difference between the reference value and the test value, such as an arithmetic difference. As further described herein, the fuel attribute signal may be indicative of whether the test fuel is the same as the reference fuel. The fuel attribute signal might also be indicative of the actual identity of the test fuel, such as a type of diesel fuel or diesel fuel blend. The fuel attribute signal might also be indicative of the relative proportions of different constituents of a fuel blend or the relative fuel quality such as an amount of contaminants in the test fuel as compared with the reference fuel.

As mentioned above, in the data acquisition mode engine 10 may be operated under a predefined set of engine operating conditions or operating point where reliably precise and accurate reference data can be expected. In the fuel testing mode, engine 10 may be operated at the same or substantially the same operating point. In other words, the test value may be determined under operating conditions which are as close as practicable to the operating conditions under which the reference value is determined. Further, the fueling duration change commanded in the fuel testing mode may be same fueling duration change that is commanded in the data acquisition mode. It may thus be appreciated that the primary and possibly sole difference between operating engine 10 in the data acquisition mode versus operating engine 10 in the fuel testing mode may be the fuel type used in engine 10.

Those skilled in the art will be familiar with the differing energy content of different fuel types, fuel blends, and fuels of different relative quality. Conventional winter diesel has a different energy content than conventional summer diesel. Similarly, certain biodiesel fuels may have an energy content different from conventional diesel fuels and different from other biodiesel fuels. Soy-derived biodiesel may have a different energy content than fryer grease-derived biodiesel, for example. The different energy content between a relatively pure sample of a fuel versus the energy content of a contaminated sample of fuel will also be readily recognized by those skilled in the art.

Under similar operating conditions, an engine speed response to a commanded change in fueling duration with a first fuel having a first fuel energy content can be expected to be greater or less than an engine speed response to a commanded change in fueling duration with a second fuel having a second fuel energy content. The present disclosure leverages these differences in fuel energy content to enable determination of a fuel attribute by observing how engine 10 responds differently to commanded fueling duration changes when operated with different fuel types. Thus, the fuel attribute signal outputted by electronic control unit 62 may be a fuel attribute signal which is indicative of an energy content per unit volume of the test fuel relative to an energy content per unit volume of the reference fuel.

In one embodiment, the change in commanded fueling in the data acquisition mode and in the fuel testing mode may be a minimum controllable fueling duration change. Various factors known to those skilled in the art define a minimum controllable fueling duration change, such as fuel pressure, response time of a fuel injector electrical actuator, etc. In general, by changing fueling duration in engine 10 by a minimum controllable amount, a resulting engine speed response such as a change in engine RPM will be relatively small. The difference in relative energy content among different fuel types will often be relatively small. Accordingly, by incrementing fueling duration in engine 10 by a minimum controllable amount, the data acquired for determining the reference value may have a relatively high resolution. Likewise, the data acquired in the fuel testing mode may have a similarly high resolution. In other words, with relatively larger commanded changes in fueling duration, the resulting engine speed response may be relatively larger, and discerning differences in engine speed responses to commanded fueling duration changes among different fuel types may be relatively more difficult. Thus, a minimum controllable amount of fueling change between sets of engine cycles in the respective data acquisition and fuel testing modes may be used. In one embodiment, the data acquisition mode and fuel testing mode may include initially commanding a minimum controllable fueling duration change. If an engine speed response to the minimum controllable fueling duration change is zero, then electronic control unit 62 may command a fueling duration change which is larger than the minimum controllable fueling duration change in another set of successive engine cycles. The commanded fueling duration change may be incrementally increased until an engine speed response is detected. This strategy will allow determining an engine speed response which is as small as possible, and thus enable data with as high a resolution as is practicable.

It will further be recalled that electronic control unit 62 may include a digital engine speed governor. In one embodiment, the minimum controllable fueling duration change may correspond to a one-bit change in fueling control signal duration. In other words, electronic control unit 62 might increment a fueling command duration between the first set of successive engine cycles and the second set of successive engine cycles by one bit. For example, changing a fueling command duration between the first set of successive engine cycles and the second set of successive engine cycles by one bit may be understood to energize electrical actuators 34 in the second set of successive engine cycles for a time duration that is shorter or longer than a time duration during which they are energized in the first set of successive engine cycles by an amount corresponding to a one bit change in signal value. The present disclosure further contemplates testing engine 10 to determine how much of a change in fueling control signal duration is expected to induce a detectable engine speed response. As alluded to above, if a one-bit change does not consistently result in a detectable engine speed response, then a two-bit change, three-bit change, etc., may be attempted. To optimize data resolution and, hence, optimize the ability of control system to detect differences in energy content among different fuel types, an amount by which commanded fueling duration is changed in the respective data acquisition and fuel testing modes may thus be determined empirically.

In one embodiment, operating engine 10 in the data acquisition mode may take place prior to placing engine 10 in service. Since even supposedly identical engines may vary in operation from one to another due to manufacturing tolerances and the like, determining a reference value indicative of an engine speed response to a commanded fueling duration change will typically take place for each individual engine. Over a service life of an engine, however, and particularly after break-in, engine operating characteristics may change. Thus, when initially placed in service an engine might exhibit an engine speed response of "X" RPM change to a one-bit change in fueling command duration with fuel "Y". Later in the engine's service life, however, a different engine speed response to the same change in fueling command duration might occur. For this reason, it may be desirable to update the reference value by executing the data acquisition algorithm plural times over a service life of an engine. In particular, engine 10 may be operated with the reference fuel in a fifth set of successive engine cycles, and the data acquisition algorithm may be activated responsive to operating engine 10 with the reference fuel in the fifth set of successive engine cycles. Electronic control unit 62 could then command a fueling duration change between the fifth set of successive engine cycles and a sixth set of successive engine cycles, and determine an updated reference value similar to the foregoing description of the data acquisition mode. An operator or technician could decide to supply engine 10 with the reference fuel, then manually activate the data acquisition mode to enable updating the reference value. Updating could take place, for example, when engine 10 is removed from service for maintenance, rebuild, etc., or at other times where a known reference fuel is provided.

INDUSTRIAL APPLICABILITY

Figure 2:
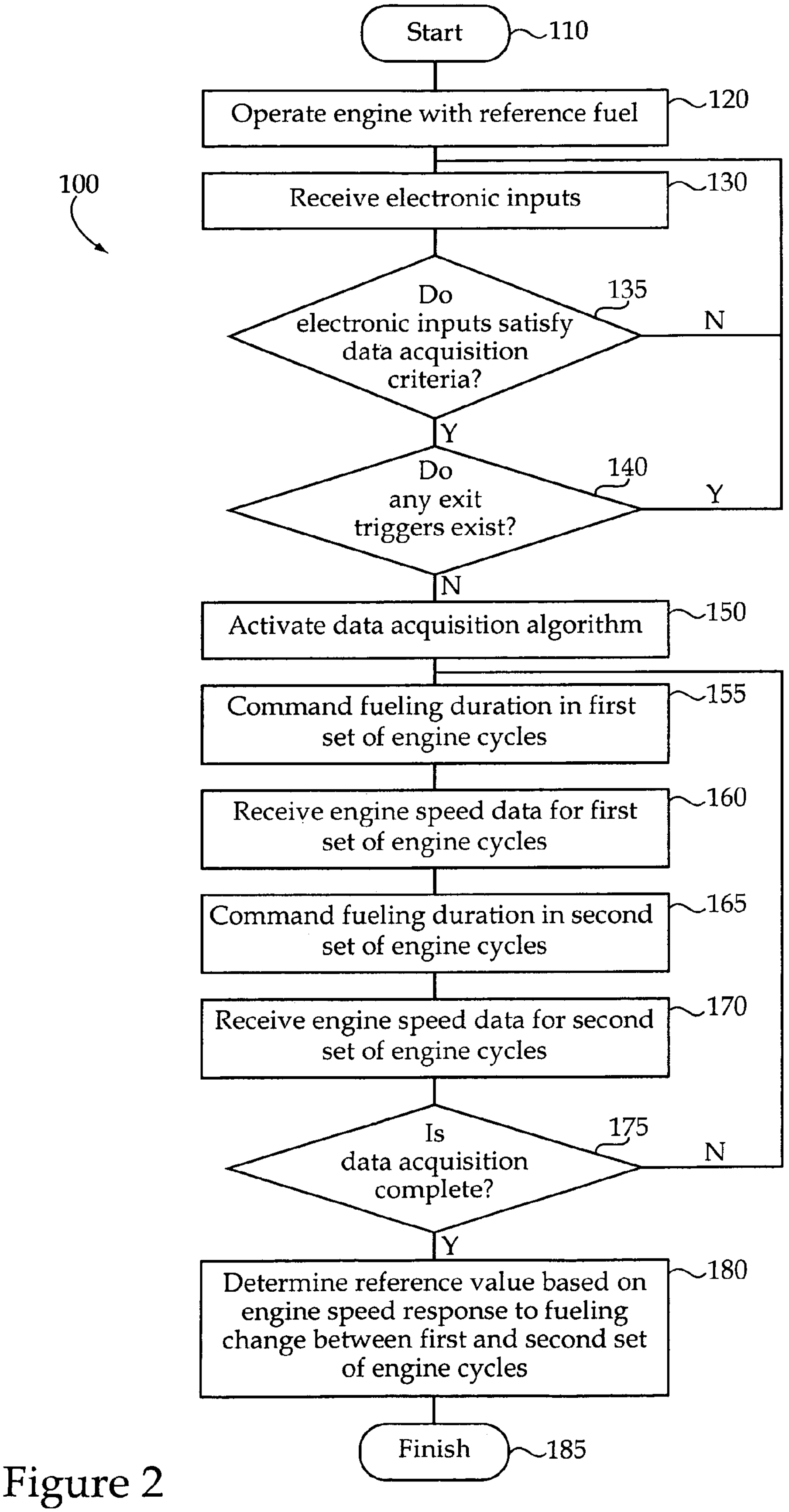
FIG. 2 is a flowchart illustrating a data acquisition routine executed during operating the engine of FIG. 1.

Referring to FIG. 2, there is shown a flowchart 100 illustrating a process which includes operation of engine 10 in an example data acquisition mode. The process of flowchart 100 may start at step 110, and may then proceed to step 120 to operate engine 10 with a reference fuel. From step 120, the process may proceed to step 130 where electronic control unit 62 receives a plurality of electronic inputs. As discussed above, electronic control unit 62 may receive electronic inputs from sensors 64, 70, 71, 72, 74, 76, as well as from exhaust particulate filter 52, etc. The sensor inputs may indicative, respectively: a fuel pressure in common rail 20; an intake airflow amount or rate; an exhaust gas recirculation amount, rate, percentage, etc.; a boost pressure; a coolant temperature; a regeneration state of exhaust particulate filter 52; and, an engine speed. Electronic control unit 62 may also be receiving additional inputs such as inputs indicative of a load range in which engine 10 is operating, inputs indicative of whether an air conditioner is running or not, inputs indicative of whether ancillary loads exist such as from a generator coupled with engine 10, and electronic inputs indicative of a variety of other engine operating parameters such as fuel injection timing. From step 130, the process may proceed to step 135 where electronic control unit 62 may query whether the electronic inputs satisfy data acquisition criteria.

At step 135, electronic control unit 62 may be understood as determining whether engine 10 is at an operating point where reliably accurate or precise data associated with an engine speed response to a commanded change in fueling can be expected to be obtained. In one embodiment, the determination at step 135 might include determining an engine speed or engine speed range, an engine load or engine load range, a regeneration state of exhaust particulate filter 52, whether engine 10 is accelerating, decelerating or neither, whether an air conditioner is off or on, whether exhaust particulate filter 52 is regenerating or not regenerating, whether fuel pressure of common rail 20 is within a predefined pressure range, whether engine coolant temperature is within a predefined temperature range, and still other parameters. One example where the electronic inputs satisfy data acquisition criteria might be the following: (1) engine speed is at or close to low idle; (2) engine ancillary load is zero; (3) engine 10 is not decelerating and is not accelerating; (4) air conditioner is off; (5) filter 52 is not regenerating; (6) fuel injection timing is at a predefined timing; and (7) coolant temperature, intake airflow, boost pressure and fuel pressure are all above a predefined minimum but below a predefined maximum.

The specific values or value ranges for the various monitored parameters, such as the minima and maxima mentioned above, may be determined empirically via known techniques. For example, engine 10 might be operated under different conditions, with each of various parameters corresponding to the electronic inputs varied, and one or more stable operating points identified where commanded fueling changes induce a detectable and repeatable engine RPM response. In other words, the data acquisition criteria may be determined by performing tests on engine 10 to identify values or value ranges for the respective electronic inputs where acceptable engine speed response data can be expected.

At step 135, if the electronic inputs do not satisfy data acquisition criteria, the process may loop back to repeat steps 130 and 135 again, or could exit. If at step 135 the electronic inputs satisfy data acquisition criteria, the process may proceed to step 140 to query whether any exit triggers exist. Exit triggers may include engine parameters different from those monitored via the aforementioned electronic inputs. For instance, if a sufficient time duration has not elapsed since starting engine 10, or if the electronic inputs have not satisfied data acquisition criteria for a sufficient time duration, then the process may loop back to repeat steps 130 and 135 again, or might simply exit. Another exit trigger might exist if engine 10 has been turned off. Still another exit trigger might be an increase in fuel amount in fuel tank 22, suggesting that fuel has been recently added and, accordingly, the integrity of any data acquired might be compromised since a different fuel type may have been introduced into fuel system 19. Exit triggers may further be understood as comprising engine stability criteria which, if satisfied, indicate that engine 10 is expected to stay at an operating point suitable for acquiring reference data. Determining whether stability criteria are satisfied may also be understood as determining whether the data acquisition criteria are more than a momentary snapshot of engine operation, and thus confirming that engine 10 is in fact operating at a stable operating point.

If no exit triggers exist at step 140, the process may proceed to step 150 to activate the data acquisition algorithm, and hence initiate operating engine 10 in the data acquisition mode described herein. From step 150, the process may proceed to step 155 wherein electronic control unit 62 may command a fueling duration in a first set of successive engine cycles, including at least two successive engine cycles. From step 155, the process may proceed to step 160 wherein electronic control unit 62 receives engine speed data for the first set of successive engine cycles. From step 160, the process may proceed to step 165 where electronic control unit 62 may command a fueling duration in a second set of successive engine cycles which is greater or less than a fueling duration commanded in the first set of successive engine cycles. The second set of successive engine cycles may also include at least two engine cycles. From step 165, the process may proceed to step 170 where electronic control unit 62 may query whether data acquisition is complete.

In one embodiment, a fueling duration change, for example between the first set of successive engine cycles and the second set of successive engine cycles described above, may be commanded individually for each of fuel injectors 32. In other words, operating engine 10 in the data acquisition mode may include determining an engine speed response to a commanded fueling duration change with fuel injectors 32 one at a time. For example, at step 165 fueling duration may be changed for only one of fuel injectors 32 while the other fuel injectors continue to receive fueling duration control commands which are the same as the commands received in step 155. Accordingly, if data acquisition is taking place by changing fueling control commands for fuel injectors 32 one at a time, the process may loop back from step 175 to repeat the process for each one of fuel injectors 32. If data acquisition is complete at step 175, the process may proceed to step 180. Testing fuel injectors one at a time is contemplated to allow detection of aberrations in engine speed response which result from degraded fuel injector performance rather than the commanded fueling duration change.

At step 180, electronic control unit 62 may determine a reference value for the reference fuel which is based on the engine speed response to the commanded fueling change between the first set of successive engine cycles and the second set of successive engine cycles. Where engine speed response is determined by changing fueling duration control commands separately to each of fuel injectors 32 in steps 155 to 170, the reference value may be an average of the engine speed response for each time steps 155 to 170 are executed, but without considering engine speed response values associated with an injector showing possible degradation. The determined reference value may be electronically stored on computer readable memory 66, for example, for use during operation in a fuel testing mode, as described herein. The foregoing description includes data acquisition and determining a reference value at one engine operating point. It should be appreciated, however, that in other embodiments engine 10 might be operated in a data acquisition mode at multiple operating points and the reference value determined by averaging or weighted averaging of engine speed response data from multiple operating points. Different operating points may be determined empirically, as described herein. From step 180, the process may end at step 185 or could loop back to repeat at another operating point.

Figure 3:
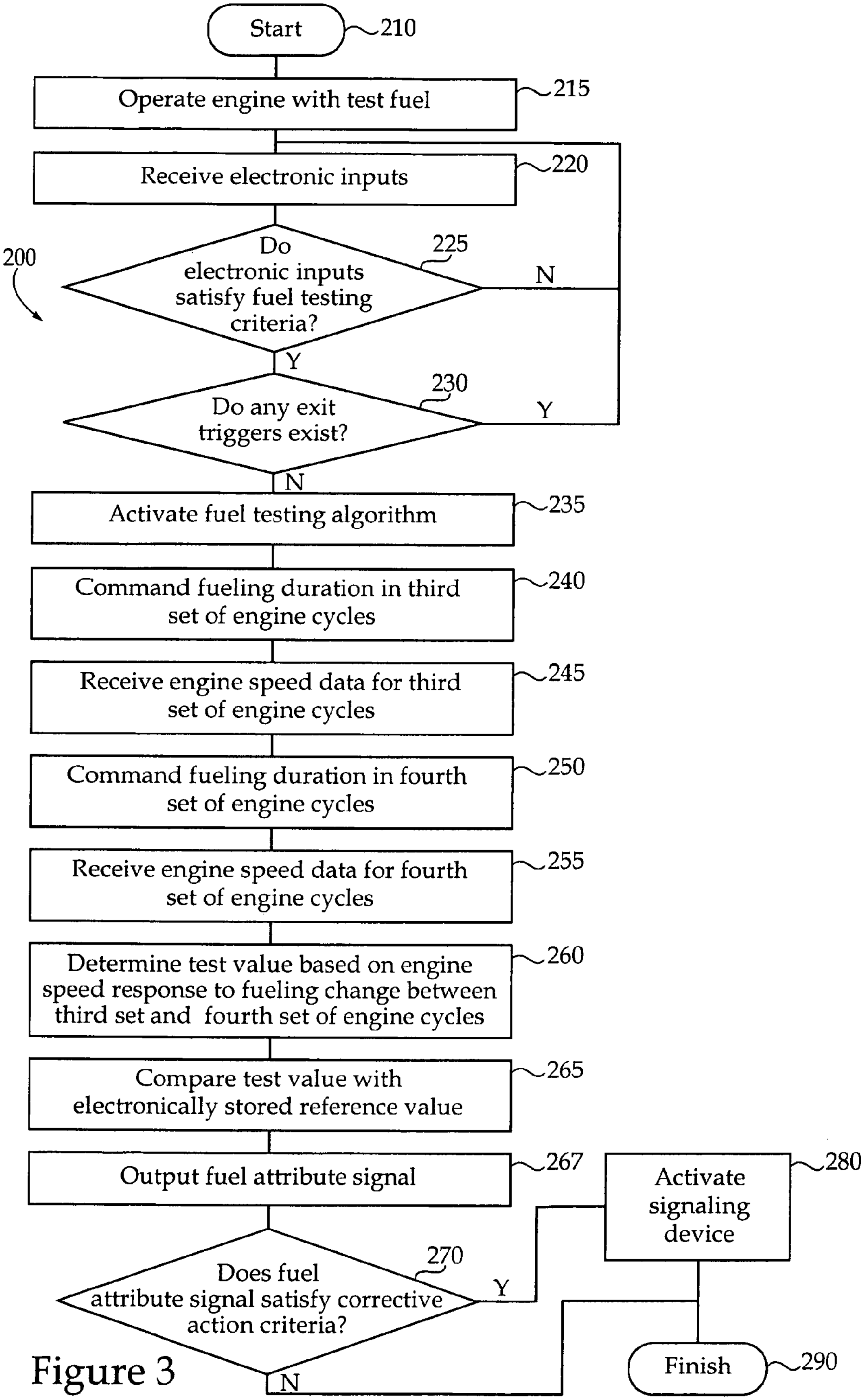
FIG. 3 is a flowchart illustrating a fuel testing routine executed during operating the engine of FIG. 1.

Referring to FIG. 3, there is shown a flowchart 200 illustrating a process which includes operation of engine 10 in an example fuel testing mode. The process of flowchart 200 may start at step 210 and thenceforth proceed to step 215 where engine 10 is operated with a test fuel. From step 210, the process may proceed to step 220 where electronic control unit 62 receives electronic inputs indicative of a plurality of different engine operating parameters. The electronic inputs received by electronic control unit 62 at step 220 may be inputs corresponding to the same operating parameters as were described in connection with step 130 in FIG. 2. From step 220, the process may proceed to step 225 where electronic control unit 62 may query whether the electronic inputs satisfy fuel testing criteria. It will typically be desirable to test a fuel in engine 10 under circumstances as close as practicable to the circumstances under which the reference value is determined. Thus, at step 225 electronic control unit 62 may determine whether engine 10 is at an operating point which is substantially the same as the engine operating point at which the reference value was determined as per the process described in connection with FIG. 2. If fuel testing criteria are not satisfied at step 225, the process may loop back to execute steps 220 and 225 again. If fuel testing criteria are satisfied at step 225, the process may proceed to step 230.

At step 230, electronic control unit 62 may query whether any exit triggers exist. Possible exit triggers may be similar to those described in connection with the data acquisition mode, such as recent fueling, insufficient time at an appropriate operating point, turning off of engine 10, etc. If exit triggers exist, the process may return to execute steps 220-230 again. If no exit triggers exist at step 230, the process may proceed to step 235 to activate the fuel testing algorithm. From step 235, the process may proceed to step 240 where electronic control unit 62 may command a fueling duration in a third set of successive engine cycles, and thenceforth may proceed to step 245 to receive engine speed data for the third set of successive engine cycles. From step 245, the process may proceed to step 250 where electronic control unit 62 may command a fueling duration in a fourth set of successive engine cycles. From step 250, the process may proceed to step 255 to receive engine speed data for the fourth set of successive engine cycles. From step 255, if additional data is to be acquired, such as data for additional fuel injectors, the process may loop back to execute steps 240-255 again. This feature is analogous to the process described in connection with FIG. 2, where data associated with changing fueling command duration to individual fuel injectors may be received and data associated with fuel injector degradation identified. Further, if fuel testing is to take place at multiple operating points, steps 240-255 may be repeated but with certain engine operating parameters changed, again analogous to the process described in connection with FIG. 2.

From step 255, the process may proceed to step 260 where electronic control unit 62 may determine a test value based on an engine speed response to a fueling change between the third set of successive engine cycles and the fourth set of successive engine cycles. From step 260, the process may proceed to step 265 where electronic control unit 62 may compare the test value with the stored reference value, and thenceforth to step 267 where electronic control unit 62 may output a fuel attribute signal responsive to comparing the reference value with the test value. The fuel attribute signal may be based at least in part on a difference between the test value and the reference value. From step 267, the process may proceed to step 270 where electronic control unit 62 may query whether the fuel attribute signal satisfies corrective action criteria. If yes, the process may proceed to step 280 to activate signaling device 80. If no, the process may end at step 290.

As discussed above, signaling device 80 may include an operator perceptible signaling device such that an operator may take a corrective action such as shutting down engine 10 or seeking service for engine 10, etc. Signaling device 80 might also include a device configured to output a signal to control system 60 to modify the engine operating strategy based on differences between the test fuel and the reference fuel. For example, at step 270 electronic control unit 62 might determine whether the difference between the test value and the reference value, as indicated by the fuel attribute signal, indicates that fueling control commands should be modified. In other words, the difference between the test value and the reference value might indicate that the engine fueling maps currently being used are not appropriate, and signaling device 80 could indicate to electronic control unit 62 that a different fueling map appropriate to the test fuel should be used. The difference between the test value and the reference value might also indicate that highly contaminated fuel is being used, such as where the test value indicates an engine speed increase substantially less than an engine speed increase associated with the reference value. In one embodiment, engine 10 may be operated in subsequent successive engine cycles responsive to a difference between the reference value and the test value, for example by outputting fueling control commands having a control command duration which is a mapped duration modified based on the difference between the test value and reference value. Electronic control unit 62 could also switch fueling maps responsive to a difference between the test value and reference value.

Operating engine 10 according to the present disclosure can thus enable determination of which of two or more types of fuel are being used, and in certain circumstances may enable determination of the relative proportions of different fuel constituents in a fuel blend. For instance, if the test value for a test fuel as discussed above is determined to be substantially the same as the reference value for a reference fuel, then it might be concluded that the test fuel is the same type of fuel as the reference fuel or includes the same or similar relative proportions of different blended fuel types. If the test value differs from the reference value by a given amount, then the identity of the test fuel might be determined by referencing earlier acquired data. In one embodiment, engine 10 might be operated with a variety of different fuels and reference data acquired for each of the fuels such that later fuel testing can match a test value for an unknown fuel with a reference value for a known fuel to identify the test fuel. By electronically storing test data indicative of fuel type or quality, a fueling history of engine 10 may also be established, useful for diagnostic purposes when engine 10 is removed from service for maintenance, rebuild, etc.

It should further be appreciated that fuel testing according to the present disclosure may take place opportunistically. Thus, electronic control unit 62 may be continuously or periodically executing a monitoring routine corresponding to steps 220-230 to identify when engine 10 is operating in a manner amenable to fuel testing. In one embodiment, each time engine 10 is refueled, electronic control unit 62 could begin looping through a monitoring routine until appropriate conditions are detected for testing the fuel. When fuel testing criteria are satisfied and no exit triggers exist, electronic control unit 62 could activate the fuel testing algorithm and evaluate the fuel being used accordingly. Thus, fuel testing according to the present disclosure may take place during time periods which present a minimal risk of limiting the availability of engine 10 for service.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent from an examination of the attached drawings and appended claims.

What is claimed is:

1. A method of operating a fuel injected multi-cylinder internal combustion engine comprising the steps of:

electronically storing a first value indicative of an engine speed response to a commanded fueling duration change between a first set of successive engine cycles and a second set of successive engine cycles during fueling the internal combustion engine with a first fuel;

determining a second value indicative of another engine speed response to a commanded fueling duration change between a third set of successive engine cycles and a fourth set of successive engine cycles;

comparing the second value with the first value; and outputting a fuel attribute signal responsive to comparing the second value with the first value.

2. The method of claim 1 further comprising a step of taking a corrective action responsive to the fuel attribute signal.

3. The method of claim 2 wherein the step of taking a corrective action further includes operating the internal combustion engine with the second fuel in another set of successive engine cycles responsive to a difference between the first value and the second value.

4. The method of claim 1 wherein the step of electronically storing a first value further includes electronically storing a reference value indicative of a change in engine RPM responsive to the commanded fueling duration change, and wherein the step of determining a second value further includes determining a test value indicative of another change in engine RPM responsive to the same commanded fueling duration change.

5. The method of claim 4 further comprising the steps of operating the internal combustion engine with the first fuel in a fifth set of successive engine cycles, activating a data acquisition mode responsive to operating the internal combustion engine with the first fuel in a fifth set of successive engine cycles, and updating the reference value in the data acquisition mode.

6. The method of claim 4 wherein the step of outputting a fuel attribute signal includes outputting a fuel attribute signal indicative of an energy content of the test fuel.

7. The method of claim 6 wherein the internal combustion engine includes a compression ignition engine, wherein the step of electronically storing a first value further includes electronically storing the first value during fueling the internal combustion engine with a first type of fuel from a common rail, and wherein the step of determining a second value further includes determining the second value during fueling the internal combustion engine with a second type of fuel from the common rail which is different from the first type of fuel.

8. The method of claim 4 further comprising a step of operating the internal combustion engine in a data acquisition mode during fueling the internal combustion engine with the first fuel, the data acquisition mode including the steps of commanding a minimum controllable fueling duration change via a digital engine speed governor between the first set of successive engine cycles and the second set of successive engine cycles, and determining an engine speed response to the commanded minimum controllable fueling duration change.

9. The method of claim 8 wherein the step of operating the internal combustion engine in the data acquisition mode further includes a step of commanding a fueling duration change larger than the minimum controllable fueling duration change between the second set of successive engine cycles and a third set of successive engine cycles, if a sensed engine speed response to the commanded minimum controllable fueling duration change is zero.

10. An internal combustion engine comprising:

an engine housing defining a plurality of cylinders and a plurality of pistons associated one with each of the cylinders and positioned at least partially therein;

a fuel system including a plurality of electronically controlled fuel injectors each configured to inject a fuel for a controllable fueling duration into one of the plurality of cylinders; and an engine control system including an engine speed sensor, a computer readable memory and an electronic control unit in communication with the engine speed sensor, the computer readable memory and the plurality of electronically controlled fuel injectors, the electronic control unit being configured to store a first value on the computer readable memory which is indicative of an engine speed response to a commanded fueling duration change between a first set of successive engine cycles and a second set of successive engine cycles during fueling the internal combustion engine with a first fuel;

the electronic control unit being further configured to determine a second value indicative of an engine speed response to a commanded fueling duration change between a third set of successive engine cycles and a fourth set of successive engine cycles during fueling the internal combustion engine with a second fuel, and responsively output a fuel attribute signal which is based at least in part on comparing the second value with the first value.

11. The internal combustion engine of claim 10 comprising a direct injection engine where each of the plurality of electronically controlled fuel injectors extends into a corresponding one of the cylinders.

12. The internal combustion engine of claim 11 wherein the fuel system further includes a fuel pump and a common rail fluidly connected with the fuel pump and with each one of the plurality of electronically controlled fuel injectors.

13. The internal combustion engine of claim 12 comprising a compression ignition diesel engine where each of the plurality of pistons is configured to increase a pressure in a corresponding one of the cylinders to an autoignition threshold, and wherein the electronic control unit is configured to output a fuel attribute signal indicative of a diesel fuel type injected into the plurality of cylinders.

14. A control system for a fuel injected multi-cylinder internal combustion engine comprising:

a computer readable memory storing a first value indicative of an engine speed response to a commanded fueling duration change between a first set of successive engine cycles and a second set of successive engine cycles during fueling the internal combustion engine with a first fuel; and an electronic control unit coupled with the computer readable memory and configured to receive inputs corresponding to a monitored engine speed of the internal combustion engine, the electronic control unit being further configured to determine a second value indicative of an engine speed response to a commanded fueling duration change between a third set of successive engine cycles and a fourth set of successive engine cycles during fueling the internal combustion engine with a second fuel, and further configured to output a fuel attribute signal which is based at least in part on comparing the second value with the first value.

15. The control system of claim 14 further comprising a signaling device controllably coupled with the electronic control unit, wherein the electronic control unit is configured to activate the signaling device responsive to the fuel attribute signal if a difference between the second value and the first value satisfies corrective action criteria.

16. The control system of claim 14 further comprising a plurality of fuel injector electrical actuators controllably coupled with the electronic control unit and an engine speed sensor in communication with the electronic control unit, wherein the electronic control unit is configured to determine the first value via incrementing a fuel injector control command duration to each one of the fuel injector electrical actuators and receiving engine speed signals indicative of a corresponding engine speed response from the engine speed sensor.

17. The control system of claim 16 wherein:

the electronic control unit is configured to determine the first value via executing a data acquisition algorithm resident on the computer readable memory;

the electronic control unit is configured to determine the second value via executing a fuel testing algorithm resident on the computer readable memory; and the electronic control unit is further configured via executing the data acquisition algorithm a second time to update the first value during fueling the internal combustion engine with the first fuel in a fifth set of successive engine cycles and a sixth set of successive engine cycles.

18. The control system of claim 17 wherein:

the electronic control unit is configured to receive a plurality of electronic inputs indicative of a plurality of engine parameters;

the electronic control unit is configured to activate the data acquisition algorithm during fueling the internal combustion engine with the first fuel, if the plurality of electronic inputs satisfy stability criteria; and the electronic control unit is configured to activate the fuel testing algorithm during fueling the internal combustion engine with a second fuel, if the plurality of electronic inputs satisfy the stability criteria.

* * * * *